United States Patent [19]
Saunders

[11] Patent Number: 5,833,855
[45] Date of Patent: Nov. 10, 1998

[54] SITU BIOREMEDIATION OF CONTAMINATED GROUNDWATER

[75] Inventor: James A. Saunders, Auburn, Ala.

[73] Assignee: Auburn University, Auburn, Ala.

[21] Appl. No.: 701,709

[22] Filed: Aug. 22, 1996

Related U.S. Application Data

[60] Provisional application No. 60/009,660, Jan. 5, 1996.

[51] Int. Cl.⁶ .................................................... C02F 3/34
[52] U.S. Cl. ........................... 210/611; 210/717; 210/728; 210/747; 210/908; 210/912; 210/913; 210/914; 435/262.5
[58] Field of Search .................................... 210/610, 611, 210/747, 908, 909, 912, 913, 914, 728; 435/262.5

[56] References Cited

U.S. PATENT DOCUMENTS

| | | | |
|---|---|---|---|
| 4,789,478 | 12/1988 | Revis et al. | 210/611 |
| 5,009,786 | 4/1991 | Oremland | 210/610 |
| 5,062,956 | 11/1991 | Lupton et al. | 210/611 |
| 5,227,069 | 7/1993 | Van Dort et al. | 210/610 |
| 5,258,303 | 11/1993 | Stenger | 435/262 |
| 5,265,674 | 11/1993 | Fredrickson et al. | 166/246 |
| 5,266,213 | 11/1993 | Gillham | 210/747 |
| 5,277,815 | 1/1994 | Beeman | 210/605 |
| 5,286,140 | 2/1994 | Mather | 405/128 |
| 5,302,286 | 4/1994 | Semprini et al. | 210/610 |
| 5,342,769 | 8/1994 | Hunter et al. | 435/166 |
| 5,384,048 | 1/1995 | Hazen et al. | 210/605 |
| 5,447,639 | 9/1995 | Sivavec | 210/747 |
| 5,514,279 | 5/1996 | Blowes et al. | 210/617 |
| 5,660,730 | 8/1997 | Lucchese et al. | 210/611 |

OTHER PUBLICATIONS

In–Situ Bioremediation of Metals and Dense Non–Aqueous Phase Liquids, U.S. Dept. of Energy, Program Solication, Closing Date: Dec. 22, 1995, p. 39.

Franco Rabolini, et al, Biological Treatment of Acid Mine Water, National Technical Information Service, Jul. 1971.

L. J. Barnes, et al., Microbial Removal of Heavy Metals and Sulfate From Contaminated Ground Waters, Emerging Technology for Bioremediation of Metals, 1994.

James A. Saunders, In Situ Bioremediation of Heavy Metal–Contaminated Groundwater by Using Sulfate Reducing Bacteria To Coprecipitate Metals in Biogenic Iron Sulfide, Dept. of Geology, Auburn University.

In Situ Bioremediation When Does It Work? National Academy Press, 1993.

In Situ Bioremediation of Heavy Metal–Contaminated Groundwater by Coprecipitation in Biogenic Iron Sulfide, James A. Saunders.

Miguel A. Haerta–Diaz et al., Pyritization of trace metals in anoxic marine sediments, Dept. of Oceanography, Texas A&M University, Apr. 21, 1992.

Balance of 5 in a constructed wetland built to treat acid mine drainage, Idaho Springs, Colorado, USA, Steven D. Machemer et al., Dept. of Chemistry & Geochemistry, Colorado School of Mines, Mar. 30, 1993.

*Primary Examiner*—Peter A. Hruskoci
*Attorney, Agent, or Firm*—Bell Seltzer Intellectual Property Law Group of Alston & Bird LLP

[57] ABSTRACT

A method for removing heavy metals and halogenated hydrocarbons from contaminated groundwaters is provided. The method provides utilizing a treatment solution comprising a soluble source of organic carbon, ferrous iron, and sulfate. Additionally, the treatment solution may comprise sulfate reducing bacteria as well as nutrients for bacterial metabolism. The treatment is designed to stimulate the growth of naturally occurring sulfate reducing bacteria such that the metals are coprecipitated in iron sulfide and the hydrocarbons are reduced to innocuous byproducts.

26 Claims, 7 Drawing Sheets

5,833,855

SITU BIOREMEDIATION OF CONTAMINATED GROUNDWATER

REFERENCE TO RELATED APPLICATION

This application is based upon, and discloses and claims the invention shown in Provisional patent application Ser. No. 60/009,660, filed Jan. 5, 1996.

FIELD OF THE INVENTION

The present invention relates to a method of in situ bioremediation of contaminated groundwater, particularly to the bioremediation of groundwater contaminated with organic and inorganic contaminants.

BACKGROUND OF THE INVENTION

With increased concerns over protecting the environment and public health and safety, the identification and removal of contaminate materials in the environment, and especially from the groundwater supply, has become one of the most important environmental concerns today. Years of unregulated dumping of hazardous materials, especially heavy metals, has severely contaminated the groundwater in many areas, creating significant health concerns. As a result, in recent years, significant emphasis has been placed upon the clean-up and remediation of contaminated groundwater and the environment surrounding dump sites, which has lead to the creation of a new industry of environmental clean-up and remediation. However, conventional technologies currently being used for remediation for contaminated sites often are very expensive, can require years to perform, and are not always effective.

Polychlorinated hydrocarbons are an additional contaminant of groundwater which is of concern. Such hydrocarbons have been used widely as chemical intermediates, solvents for dry cleaning, degreasing operations, and other applications. Chlorinated hydrocarbons are very stable compounds and are toxic at low levels. Thus, pollution of groundwater by chlorinated hydrocarbons has become an important environmental problem. Groundwater polluted by mixtures of such organic contaminants and heavy metals are particularly difficult to remediate. Furthermore, there are also many sites contaminated by mixtures of organic compounds, heavy metals, and radionuclides. As a result, new technologies are needed to clean up such sites.

Existing clean-up methods and technologies include, "pump and treat" methods in which contaminated groundwater is pumped to the surface, is cleaned chemically or by passing the groundwater through a bioreactor, and is reinjected into the groundwater. Such a process generally is carried out over a long period of time, typically one to ten years or more. An example of this type of pump and treat process is disclosed in U.S. Pat. No. 5,062,956 of Lupton et al. The Lupton patent discloses a method of reducing soluble chromium in a aqueous wastes in which the contaminated water is removed from the ground and is passed through a bioreactor containing a sludge with sulfate reducing anaerobic bacteria in a substantially continuous bioreactor. The water is recycled to the bioreactor as needed to reduce the levels of chromium therein, and once clarified, is discharged from the settling tank. A related type of environmental remediation is the "dig and haul" method in which contaminated soils are removed and are treated or land filled.

U.S. Pat. No. 5,447,639 discloses a method for destruction of chlorinated hydrocarbons in aqueous environments. The method involves adding ferrous sulfide into a pit, screened well or trench to degrade chlorinated aliphatic compounds in a permeable barrier, where the contaminants react with the pyrite or iron filings as the water passes through.

An emerging clean-up technology is "bioremediation," in which natural or genetically engineered microorganisms are applied to contaminated materials such as groundwater. The microorganisms typically are used to biodegrade soils, rocks or groundwater contaminated by organic compounds such as gasoline, crude oil, or other hydrocarbon-based contaminates. Typically, bioremediation has been used in combination with existing technology such as a pump and treat or a dig and haul process for treating contaminated soils or groundwater, as for example shown in U.S. Pat. No. 5,258,303 of Stenger and U.S. Pat. No. 5,062,956 of Lupton et al. Bioremediation further has been discussed with regard to an in situ process in which microorganisms and nutrients are injected into contaminated soils or groundwater to degrade the contaminates within the soil or groundwater without first removing the contaminated soil and/or groundwater or by stimulating the natural microorganisms within the ground. For example, U.S. Pat. No. 5,348,048 of Hazen and U.S. Pat. No. 5,265,674 of Fredrickson et al. disclose processes for biodegrading organic compounds, such as chlorinated hydrocarbons.

In situ bioremediation currently is still an emerging technology that offers a number of potential benefits and lower expense and the possibility of being able to perform a more complete remediation at a faster rate than current bioremediation processes, when conducted under optimal conditions. However, in situ bioremediation generally has been limited to aerobic biodegradation of organic compounds such as chlorinated hydrocarbons, or petroleum derivatives. For other contaminants such as heavy metals, which can pose a significant health hazard, the conventional teaching in the art has generally been to use existing pump and treat and dig and haul remediation methods, which generally have been unsuccessful in completely removing the heavy metals from the ground in which groundwater flows such that often after the clarified groundwater is returned to the ground, it quickly again becomes contaminated because the contaminant source has not been treated. Thus, the treatment of heavy metal contaminated groundwater generally has been required to be conducted substantially continuously to maintain the groundwater with contaminates at or below acceptable levels. Further, an additional problem with in situ bioremediation methods generally has been the ineffective spreading of injected bacteria due to clogging around the injection wells due to adsorption and growth of the bacteria about the wells, which occurs under aerobic conditions.

Accordingly, it can be seen that a need exists for an inexpensive and efficient method of remediation of contaminated groundwater which results in substantially complete removal of both heavy metal and polychlorinated hydrocarbon contaminates from groundwater.

SUMMARY OF THE INVENTION

The present invention is drawn to a method for removing organic and inorganic contaminants from aqueous compositions by coprecipitation of the inorganic contaminants into biogenic iron sulfide or pyrite and reduction of the organic contaminants into innocuous byproducts. The method comprises introducing a soluble source of organic carbon, sulfate, and ferrous iron as needed to stimulate the activity of naturally occurring anaerobic bacteria capable of remediating contaminated groundwater. Optionally, sulfate reducing bacteria, as well as nutrients for bacterial metabolism can be added.

The treatment solution is designed to stimulate the growth and metabolism of sulfate reducing bacteria, either added with the treatment solution or naturally occurring. The bacteria reduce sulfate to hydrogen sulfide and metabolize (oxidize) at least some organic contaminants in the process. The hydrogen sulfide reacts with the iron to form an amorphous, biogenic iron (ferrous) sulfide and pyrite. As the iron sulfides are formed, the inorganic contaminants, particularly heavy metals within the water are coprecipitated into the sulfide crystal lattice being formed in the bacterial mediated reaction. Thus, sulfate reducing bacteria can directly metabolize some organic contaminants at the same time they are removing heavy metals from groundwater. However, this technology will add an easily degradable organic compound to the waste stream to insure rapid growth and metabolism of natural sulfate reducing bacteria, which may stimulate further destruction of complex organic contaminants by a process known as cometabolism. (See, National Research Council, 1993: "In Situ Bioremediation—When Does it Work?"). Additionally, it has been shown (U.S. Pat. No. 5,447,639) that ferrous iron sulfide, which is generated by this technology, can dehalogenate and degrade halogenated hydrocarbons. Thus, in addition to precipitating heavy metals, the technology has the capability of degrading organic contaminants by three processes: (1) direct metabolism of the organic compounds by the bacteria; (2) cometabolism of the organic contaminants when an easily degradable organic compound is added; and (3) reaction of organic contaminants with ferrous iron sulfides produced during biogenic sulfate reduction.

Various objects, features and advantages of the present invention will become apparent to those skilled in the art upon a review of the following specification, when taken in conjunction with the accompanying drawings.

DETAILED DESCRIPTION

Figure 1:
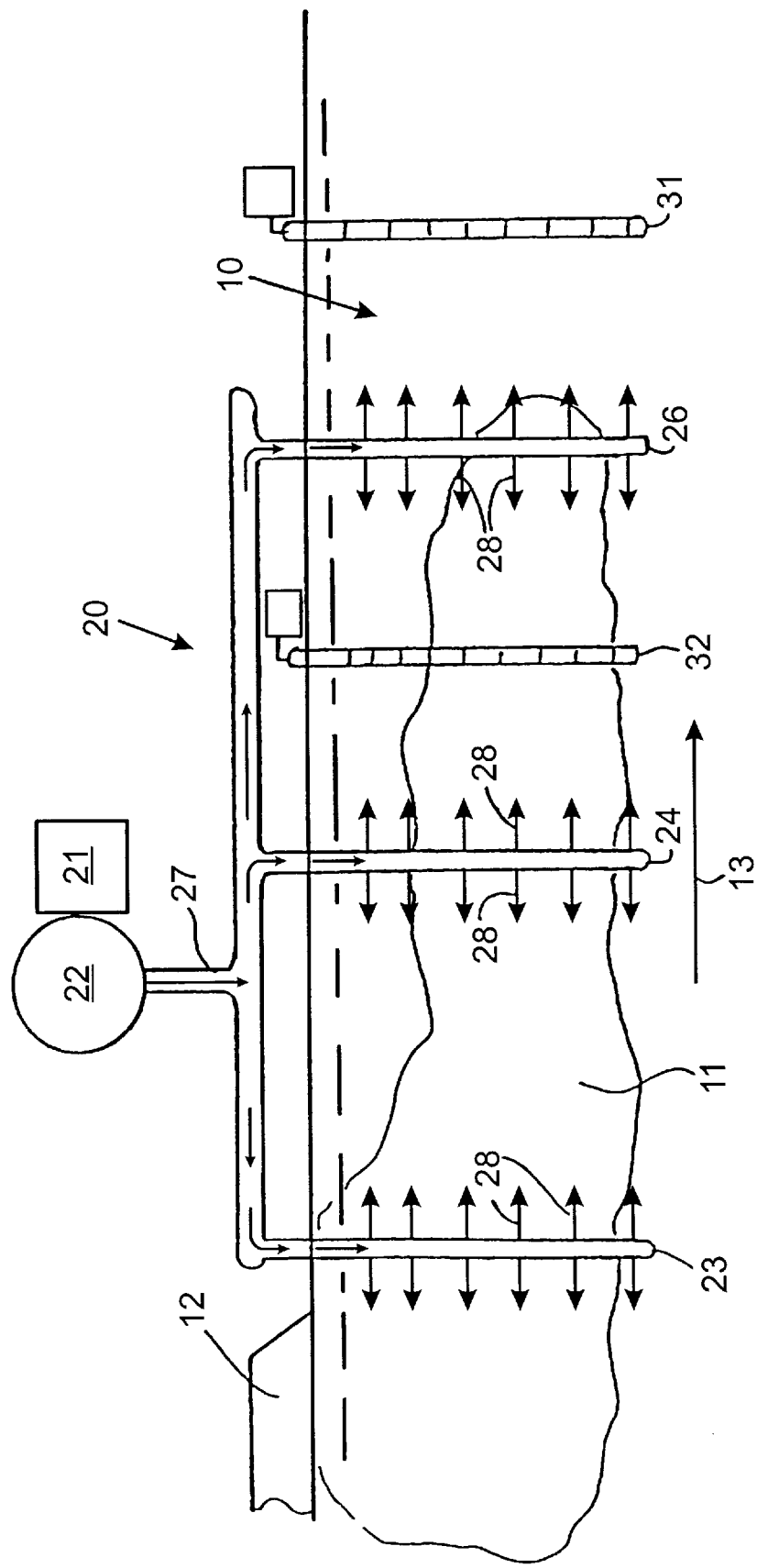
FIG. 1. A side elevational view schematically illustrating the process of in situ bioremediation of heavy metal contaminated groundwater of the present invention.

The present invention relates to a process for removing contaminants from groundwater and contaminated waste water. The process removes the contaminants from contaminated waters by the use of sulfate reducing bacteria (SRB). The process is designed to force the formation of iron sulfide by the addition of iron to the contaminated groundwater. Contaminating metals present in the water coprecipitate into biogenic iron sulfide or pyrite. Additionally, chlorinated aliphatic hydrocarbons are reduced to innocuous byproducts by reacting reductively with ferrous sulfide.

The present method is useful for in situ bioremediation of heavy metal contaminated groundwater and mixtures of heavy metals, organic contaminants, and some radionuclides. The method encourages the rapid formation of biogenic iron sulfide by introducing a treatment solution which is designed to promote the formation of the iron sulfide or pyrite. By providing optimal conditions the efficiency of remediation is increased and the activity of the bacteria increased. The present invention recognizes that the apparent kinetic favorability for metals to coprecipitate in pyrite could be exploited by in situ bioremediation using SRB.

The method additionally finds use for in situ bioremediation of groundwater contaminated with chlorinated aliphatic hydrocarbons and by analogy, many other organic contaminants. The reaction proceeds by a mechanism in which sulfide in ferrous sulfide functions as the reducing agent and is oxidized to sulfate while the oxidation state of iron remains unchanged. Sulfur is the electron transfer site at the ferrous sulfide-water interface.

The treatment solution comprises a soluble source of organic carbon as a substrate for sulfate reducing bacteria, and ferrous iron to promote the precipitation of iron sulfide. The reaction also needs a source of sulfate, sulfate reducing bacteria, as well as adequate nutrients for bacterial metabolism. When necessary, these components can also be supplied with or as a part of the treatment solution.

Metals typically exist in groundwater as either free ions, molecular inorganic complexes, or metal-organic complexes (i.e., "chelates"). Where the metals are present in the groundwater in metal-chelator complexes, the production of hydrogen sulfide by the sulfate reducing bacteria leads to removal of the metals from the chelate complex and precipitate them as sulfide minerals or coprecipitate them in iron sulfides. Furthermore, the bacteria potentially may be able to metabolize the organic chelators, which also leads to the degradation of metal-organic complexes. By inorganic contaminants is intended minerals, metals, particularly heavy metals, either unbound or complexed with a chelator. Thus, the process is useful for the removal of any metal contaminants. Metal contaminants include but are not limited to lead, chromium, arsenic, cobalt, zinc, copper, cadmium, nickel, mercury, uranium, barium, selenium, strontium, plutonium, thorium, technetium, and any metal that either has an infinity for sulfur, carbonate, or that can exist in multiple oxidation states.

By organic contaminants is intended: (1) chlorinated compounds, particularly polychlorinated hydrocarbons or chlorinated aliphatic hydrocarbons such as carbon tetrachloride, chloroform, trichloroethylene, tetrachloroethylene, chlorinated ethanes, such as 1,1,1-trichloroethane; (2) gasoline components including benzene, toluene, and xylene-type (BTX) compounds (see, Chapelle, et al. (1996), *Ground Water* v. 34, p. 699–708); and (3) other petroleum derivatives.

Generally, sulfate reducing organisms are distributed widely in nature where anoxic conditions prevail. For example, such organisms have been found in sewage, polluted water, sediment of lakes, sea and marine muds, oil wells, and the like.

The present method is designed to stimulate the activity of the naturally occurring sulfate reducing bacteria. However, if such bacteria are lacking at a particular site, or in contaminated water, they can be added to the treatment solution at the time the solution is introduced into the contaminated water or site. Likewise, bacteria can be added at any time during the treatment.

As indicated, the present method relies upon sulfate reducing bacteria present at or in the contaminated site. SRB are common in nature, even under aerobic conditions (e.g., Jones et al. (1989) *Geomicrobiology Journal* 7:117–130). While it may be desirable to add such bacteria to the treatment solution it is preferable to rely on indigenous bacteria. Such bacteria include members of the genus Desulfovibrio, particularly *Desulfovibrio desulfuricans*, members of the genus Desulfotomaculum or other sulfate reducing bacteria. Under anaerobic conditions, such sulfate reducing bacteria compete with other major types of heterotrophic bacteria for the same organic substrates. Such heterotrophic bacteria include iron reducing bacteria and methanogenic bacteria. However, as long as there is an adequate supply of dissolved sulfate, the sulfate reducing bacteria will exclude the activity of methanogenic bacteria. Therefore, for the activity of the sulfate reducing bacteria to be optimized, the treatment solution preferably also comprises dissolved sulfate. An abundance of dissolved sulfate precludes the activity of the methanogenic bacteria optimizing the activity of the sulfate reducing bacteria.

It is further recognized that sulfate reducing bacteria can be selected for those which have a high metabolic rate as well as a high toxic-metal tolerance. Such selection methods are well known in the art. Such selected bacteria can be used where metal levels are high as well as to increase the bioremediation process. Organisms at the contaminated site are likely to have undergone natural selection for metal tolerance, particularly given the short time (approximately 1 week) between generations of SRB. Thus, the most ideal biodegraders, in all likelihood, already exist at the contaminated site because the site specific contaminants have driven natural selection.

The addition of iron to the treatment solution promotes the precipitation of iron sulfide as well as hinders the activity of iron reducing bacteria. For convenience, the iron and sulfate can be provided to the treatment solution in the form of ferrous sulfate ($FeSO_4$). Generally, the amount of ferrous sulfate added to the solution will be from about 0.25 to about 3 moles, preferably about 0.5 to about 2 moles, more preferably about 1 mole.

Generally, the presence of $H_2S$, heavy metals, and the lack of ferrous iron can be toxic to or inhibit sulfate reducing bacteria and limit the effectiveness of sulfate reducing bacteria in removing toxic metals from contaminated groundwaters. However, the addition of ferrous iron to the solution promotes the precipitation of metal sulfide in the form of iron sulfide. Therefore, the coupled processes of sulfate reduction and solid sulfide mineral formation serves to limit the concentrations of potentially toxic $H_2S$ and metals in the environments where sulfate reduction is occurring.

Organic carbon is also included in the treatment solution to provide a substrate for the sulfate reducing bacteria. Generally, several different carbon sources may be utilized such as lactate, ethanol, acetate, etc. However, the choice of organic substrates can enhance the action of the sulfate reducing bacteria versus the iron reducing bacteria. A preferred source is lactate which is degraded by rapidly growing bacteria to the simplifier acetate molecule. In contrast, other species of sulfate reducing bacteria can completely oxidize the organic substrate to $CO_2$ or bicarbonate, although they tend to do so at a much slower pace than the incomplete oxidizers. In the present method, if lactate is utilized, the bacteria which are complete oxidizers will utilize the partial oxidation products of the rapidly growing bacteria, i.e. acetate, for their metabolism in a synergistic arrangement and may be a long-lived source of $H_2S$.

The injection or organic carbon with sulfate in the same well may lead to very rapid bacterial growth (i.e., biomass) around the injection wells. To avoid the rapid growth, pulsed injection can be utilized. That is, organic carbon is added into one or more wells first, followed by the addition of sulfate. In this manner, mixing occurs away from the injection well.

Alternatively, organic carbon and sulfate can be injected through different wells into the plume. Again, mixing will occur in the plume away from the injection well.

While the present invention is not bound by any particular mode of action, it is believed that the inclusion of lactate into the treatment solution will initially stimulate the sulfate reducing bacteria that are rapid decomposers of lactate. This will lead to a rapid precipitation of metals and the formation of acetate by the partial oxidation of lactate. Subsequently, the complete oxidizers will be stimulated to use the produced acetate, which will lead to the removal of the more recalcitrant metals and insure that conditions remain anaerobic in the subsurface after remediation is complete.

The carbon source is provided in an amount to provide for growth and metabolism of the bacteria. Generally, the carbon source, in the form of lactate acid or sodium lactate, is provided to the treatment solution in a concentration of from about 0.25 to about 3 moles, preferably about 0.5 to about 2 moles, more preferably about 1 mole.

Nutrients for bacterial growth and metabolism can be provided in the treatment solution. Aside from water, seven elements: carbon, oxygen, nitrogen, hydrogen, phosphorous, sulfur and potassium, are the major components of all living matter. If necessary, any of these elements can be included in the treatment solution. Generally, the nutrients will be present in the groundwater to be treated. However, if it is necessary to stimulate the growth or metabolism of the sulfate reducing bacteria (either indigenous or added with the treatment solution), nitrogen and phosphorous can be added, preferably in the form of ammonium phosphate. Such ammonium phosphate is provided to the solution at a concentration in the range of about 2% to about 15% of the carbon source, preferably about 3% to about 8% of the carbon source, more preferably about 5% of the carbon source. The ammonium phosphate reacts in solution to provide nitrogen and phosphorous for the sulfate reducing bacteria.

The activity of the sulfate reducing bacteria is optimized if the groundwater pH is about 5.5 to about 7.0 range. It may be necessary to raise the groundwater pH in some settings. Thus, in these instances, the pH can be raised by the addition of sodium bicarbonate, carbonate, hydroxide, or the like to the treatment solution.

When treating a contaminated groundwater site, the treatment solution can be introduced directly into the contaminated plume. Alternatively, a biologically active zone can be created about or in front of a plume of contaminated groundwater. The biologically active zone is created by the injection of the treatment solution into or about the migrating plume. The treatment solution may be injected through either existing wells or wells drilled specifically for bioremediation. When the treatment solution is injected, it is preferable to keep the solution and aquifer materials under an anaerobic conditions. In this manner, tanks containing the injected solution will be purged of dissolved oxygen by the addition of nitrogen. Additionally, compressed nitrogen gas can be used to inject the solution into the subsurface to maintain anaerobic conditions. Optimal points of injection include into the plume and possibly in advance of the migrating plume front.

The number of wells, pumping rates, total amounts of injected solution added will depend upon several factors including size of the contaminant plume, nature of the hydrogeologic conditions at the site, for example, porosity, permeability, and variability, concentration of metal contaminants, time constraints, and the like.

Continuous monitoring of metal contaminants in the groundwater will indicate whether additional solution should be injected or whether additional injection wells should be made about the plume.

The treatment solution is added to the plume at a concentration of about 0.1 to about 5%, depending on concentrations of reagents used. Some dilution by pure water of injected solution may be necessary depending on site conditions to optimize their dispersal and prevent biomass buildup locally.

It is recognized that the claimed method can be utilized in combination with other processes for removing chemical contaminants from water. When the degradation mechanisms for two or more co-occurring contaminants are mutually exclusive, sequential treatment schemes can be devised. Alternatively, the treatment solution can be utilized as part of another cleaning process for groundwaters.

It is further recognized that while the present method is designed to treat groundwater at the site of contamination, the present method can be used in reaction vessels to treat waters, re-worked soils, or as an in situ process. For example, the process finds use as an in situ treatment of groundwater in abandoned underground mine workings below the water table.

Figure 2:
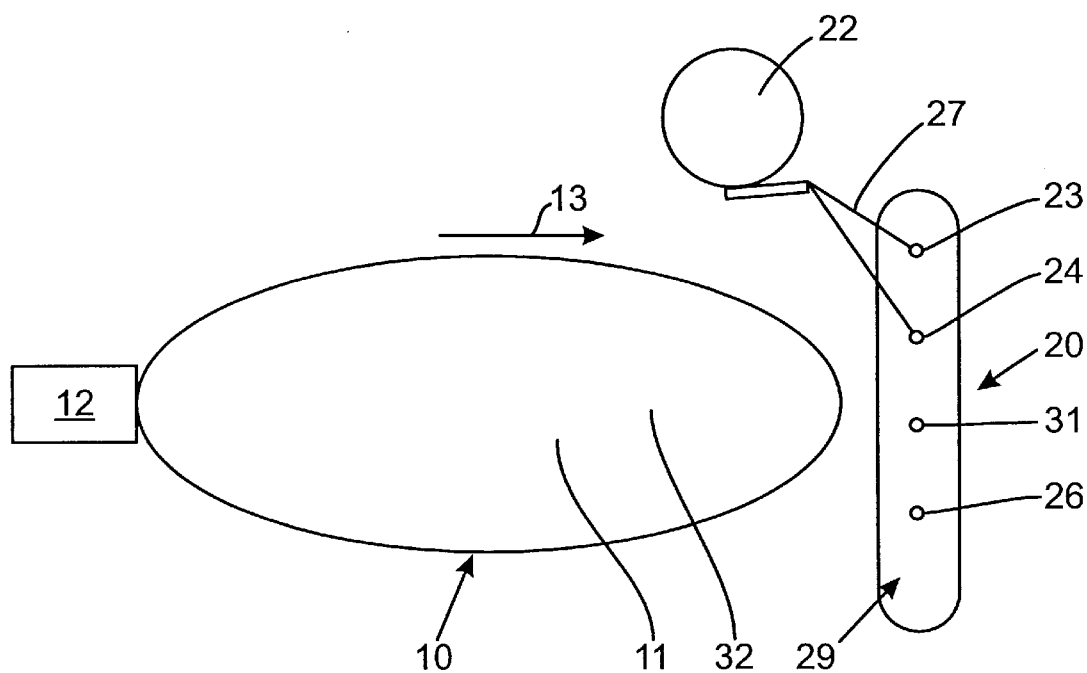
FIG. 2. A plan view schematically illustrating the method of the present invention.

Referring now in greater detail to the drawings in which like numerals indicate like parts throughout the several views, FIGS. 1 and 2 schematically illustrate the process of the present invention for in situ bioremediation of heavy metal contaminated groundwater 10 by using sulfate reducing bacteria to coprecipitate the heavy metals in biogenic iron sulfide. As shown in FIG. 1, a contaminant plume 11 of heavy metals such as lead, mercury, arsenic, selenium, chromium, etc. is released from contaminant source 12 into the groundwater table 10. The contaminant plume migrates from the contaminate source 12 in the direction of arrow 13, moving through and contaminating the groundwater 10.

An injection system 20 is established about the contaminant plume 11. The injection system 20 generally includes an air compressor 21, a solution tank 22 containing the aqueous treatment solution, and a series of injection wells 23, 24, 26. It will be understood by those skilled in the art that while only three injection wells are illustrated, additional injection wells typically can be used to ensure full coverage of the contaminant plume. The injection wells can also be existing wells or can be drilled specifically for use in the present method.

The injection wells 23–26 generally are drilled either in front of or about the migrating contaminant plume 11, as shown in FIG. 2, or directly into the contaminant plume, as shown in FIG. 1. Conduits 27 (FIG. 1) connect the injection wells 23–26 to the treatment solution tank 22 for supplying the treatment solution from the tank 22 under pressure to the injection wells as indicated by arrows 28 in FIG. 1. The treatment solution flows into the injection wells and is dispersed into the contaminant plume to create a biologically active zone (BAZ) 29 (FIG. 2) that reacts with the contaminant plume to remove the heavy metal contaminants contained therein from the groundwater.

Additionally, monitoring wells 31, 32 are drilled at desired locations along and in front of the contaminant plume. The monitoring wells enable measurements to be taken of the concentration of heavy metal contaminants within the groundwater during various stages of the treatment process. Thus, the effectiveness of the treatment process can be measured to determine its progress.

In general, the treatment solution of the present invention is designed to stimulate naturally occurring sulfate reducing bacteria such as *Desulfovibrio desulfuricans* in and around the site to be remediated. Typically, the treatment solution will contain a source of degradable organic carbon for the sulfate reducing bacteria, such as sodium lactate or lactic acid ($C_3H_6O_3$). The carbon source is dissolved in solution at approximately one mole per liter of solution, 90 grams per liter for lactic acid and 112 grams per liter for sodium lactate. One mole of ferrous sulfate ($FeSO_4$) is added to the solution, at approximately 152 grams per liter. The ferrous sulfate serves as a source of iron that reacts to form iron sulfide or pyrite ($FeS_2$). Additionally, ammonium phosphate [$(NH_4)_3 PO_3$] is added to the solution at a concentration of approximately five percent (5%) of the carbon source (i.e. lactic acid), approximately 7.5 grams per liter. The ammonium phosphate reacts in solution to provide nitrogen and phosphorous that acts as food or nutrients for the sulfate reducing bacteria. Concentrations of sulfate reducing bacteria also can be added to the treatment solution injected into the contaminant plume at sites where naturally occurring sulfate reducing bacteria populations are lacking.

The amount of treatment solution injected at each site is dependant on the particular characteristics of each site such as the size of the contaminant plume, hydraulic conductivity of subsurface materials, the number and placement of injection wells and the concentration of the heavy metal contaminants. Optimally, the treatment solution is injected directly into the contaminant plume and possibly in advance of the migrating contaminant plume. The treatment solution is injected into the contaminant plume through the injection wells using compressed nitrogen gas, to keep the solution and aquifer materials of the groundwater table under anaerobic conditions.

Upon injection of the treatment solution into and about the contaminant plume, the naturally occurring sulfate reducing bacteria within the surrounding substrate react with the sodium lactate, or other carbon source within the treatment solution, causing the lactate to be degraded into acetate. Thus, sulfate reducing bacteria that are rapid degraders of lactate are initially stimulated, causing the formation of acetate and iron sulfide (pyrite) into which most of the metals within the contaminant plume are coprecipitated. Subsequently, the acetate is decomposed by slower metabolizing sulfate reducing bacteria, leading to the removal of more recalcitrant metals and insuring that conditions in the subsurface remain anaerobic.

Initially, the process should produce metastable amorphous ferrous (iron) sulfide, which slowly recrystallizes to form more stable iron sulfide/pyrite ($FeS_2$). Metals such as cobalt, nickel, arsenic, selenium, mercury, etc. will tend to precipitate into the iron sulfide crystals thus formed by the sulfate reducing bacteria. Depending on their concentrations relative to dissolved iron, other metals such as zinc, cadmium, and lead may either coprecipitate in pyrite and/or precipitate into their own stable metal-sulfide phase (e.g., ZnS). Further, chromium, uranium, vanadium, and technetium are "redox-sensitive" elements that are most soluble under relatively oxidizing conditions. The mere action of SRB (by producing $H_2S$) makes the solution more reducing, causing these elements to be reduced:

Cr(VI)—Cr(III)*(one of most toxic and common metal contaminants)

V(VI)—V(IV)

V(VI)—U(IV)*(common in radioactive wastes (DOE sites))

Tc(VI)—Tc(IV).

When these elements are reduced they precipitate as oxide or hydroxide compounds that are very insoluble under reducing conditions. Thus, this is an indirect consequence of the process, but highly beneficial. The heavy metal contaminants are diffused out of the least permeable zones of the substrate surrounding the contaminant plume so that the metals are removed from the groundwater.

The present invention thus offers an inexpensive but highly effective method of remediating groundwater contaminated with heavy metals and halogenated hydrocarbons. Both the organic and inorganic contaminants are rapidly removed and long term anaerobic conditions at the site are ensured.

It further will be recognized by those skilled in the art that while the present invention has been disclosed with references to a preferred embodiment, numerous changes, modifications and additions can be made thereto without departing from the spirit and scope of the invention.

EXPERIMENTAL

Introduction

Evidence to support the present invention has been demonstrated in at least two settings described below: 1) a shallow alluvial aquifer in east-central Alabama where coarse-grained pyrite ($FeS_2$) has replaced lignitic wood during the last 7000 years; and 2) a salt dome cap rock in Mississippi recently drilled for its mineral resource (sulfur) potential, where iron sulfides (pyrite, marcasite, and pyrrhotite) form a zone about 30 m thick.

In a shallow alluvial aquifer in east-central Alabama coarse-grained pyrite ($FeS_2$) has replaced lignitic wood during the last 7000 years.

Figure 3:
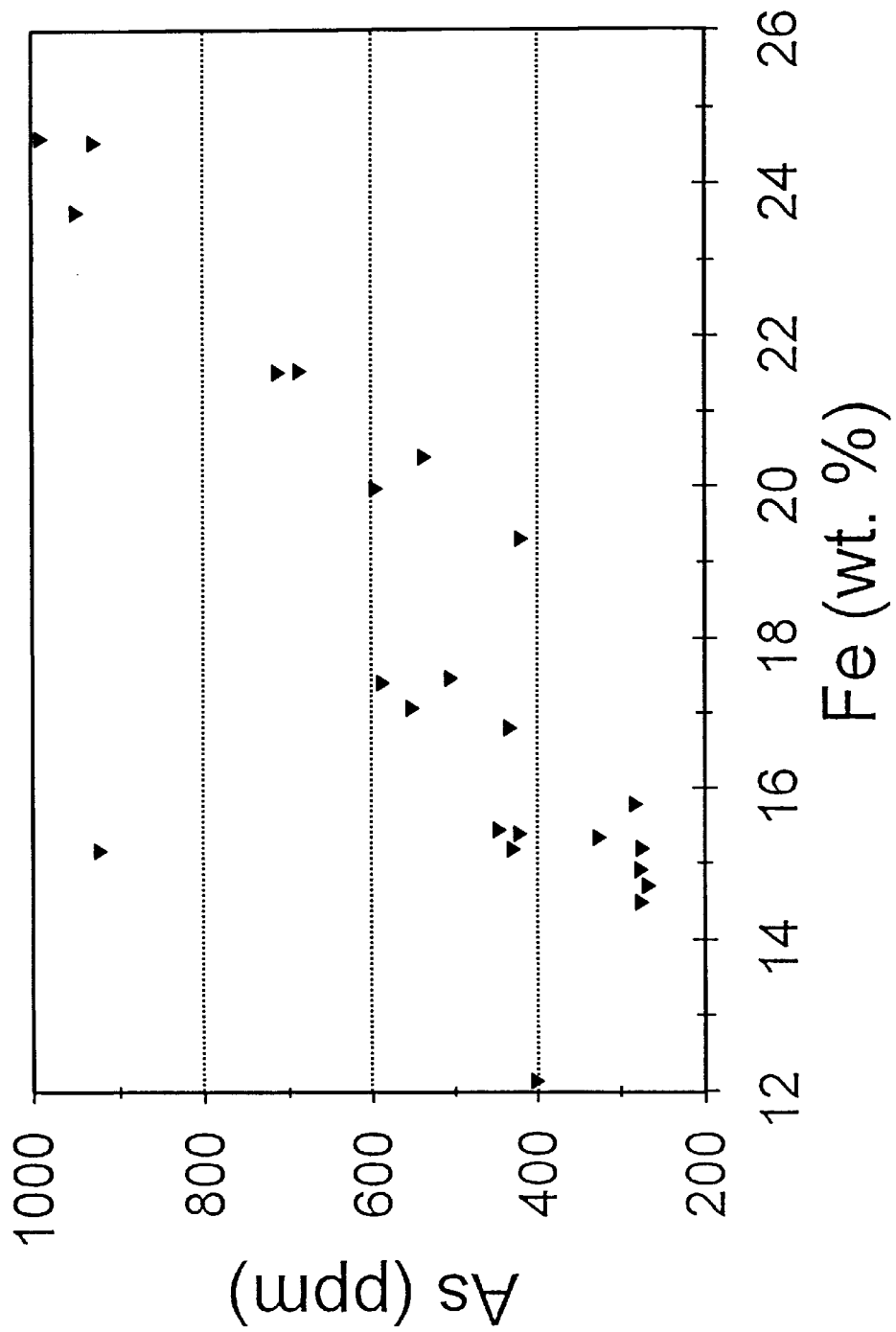
FIG. 3. Plot of arsenic versus iron content (ICP data) of 7000-year-old pyritized wood samples from Macon County, Alabama.
Figure 4:
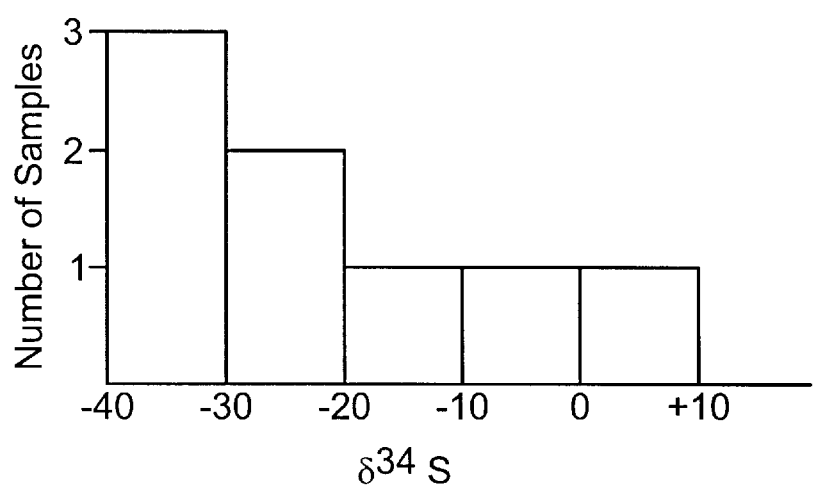
FIG. 4. Histogram $\delta^{34}S$ per mil for As—Co—Ni—rich pyrite from Macon County, Alabama. Values less than −20 per mil typically indicate bacterial sulfate reduction as the origin of the pyrite.
Figure 5:
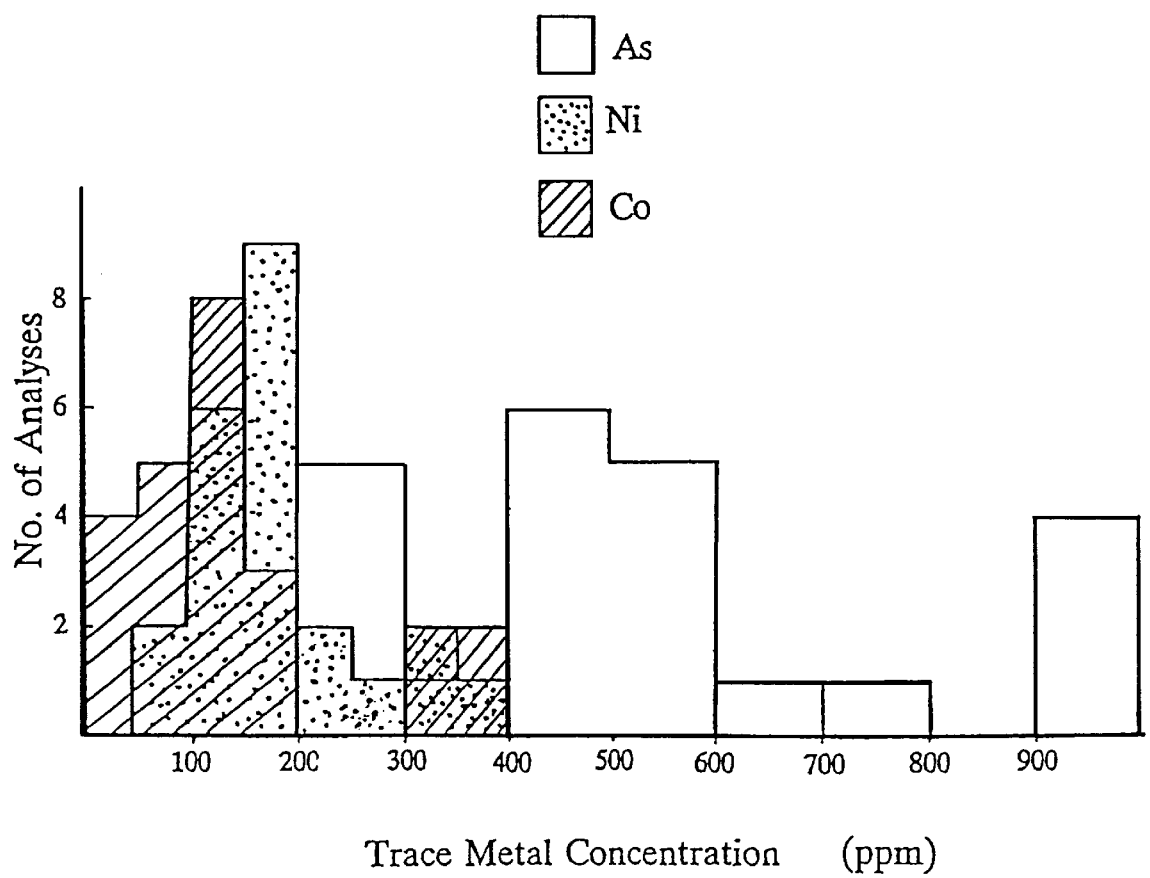
FIG. 5. Histogram of arsenic, cobalt, and nickel concentrations in pyritized wood samples from Macon County, Alabama.

Pyrite that precipitated and replaced lignitic wood fragments in an alluvial aquifer in Macon County, Alabama, preserved cellular wood textures and was enriched in the trace metal(loid)s cobalt, nickel (100–500 ppm each), and arsenic (300–1000 ppm). There was a strong correlation between trace elements and iron content (particularly arsenic, FIG. 3) in the pyritized wood. X-ray diffraction, SEM, and electron microprobe analyses indicated that the trace metals were homogeneously distributed within the pyrite crystal lattice (probably substituting for both iron and sulfur). This suggested a kinetic favorability of some metal (loid)s to coprecipitate in pyrite as opposed to making separate sulfide phases such as $As_2S_3$. The sulfur isotopic composition of the pyrite ($\delta^{34}S$ values typically in the −20 to −40 per mil range, FIG. 4) fingerprints a major role for SRB in forming the pyrite. SRB preferentially use $^{32}S$ in dissolved sulfate to make $H_2S$, and thus biogenic sulfide is depleted in $^{34}S$ relative to the average S-isotope distribution in nature (i.e., negative per mil shift). Groundwater surrounding the logs contained up to 3.6 ppm Fe and up to 2.4 ppm $SO_4$, 1–8 ppb each of Co, Ni, As, V, Cu and Zn and had a pH of 6.55. FIG. 5 gives a histogram of arsenic, cobalt, and nickel concentrations in pyritized wood samples from Macon County. Anaerobic sulfate reduction was occurring locally around the macro wood fragments, leading to iron sulfide formation by a reaction such as:

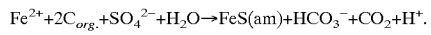

$$Fe^{2+}+2C_{org.}+SO_4^{2-}+H_2O \rightarrow FeS(am)+HCO_3^-+CO_2+H^+.$$

In the process, amorphous FeS quickly inverts to pyrite by a sulfidation reaction (e.g., Morse et al. (1987) *Ear. Sci. Rev.* 24:1–42; Schoonen and Barnes (1991) *Geochim. Cosmochim. Acta.* 55:1496–1504; Schoonen and Barnes (1991) *Geochim. Cosmochim. Acta.* 55:1505–1515).

In a salt dome cap rock in Mississippi recently drilled for its mineral resource (sulfur) potential, iron sulfides (pyrite, marcasite, and pyrrhotite) form a zone about 30 m thick.

Figure 6:
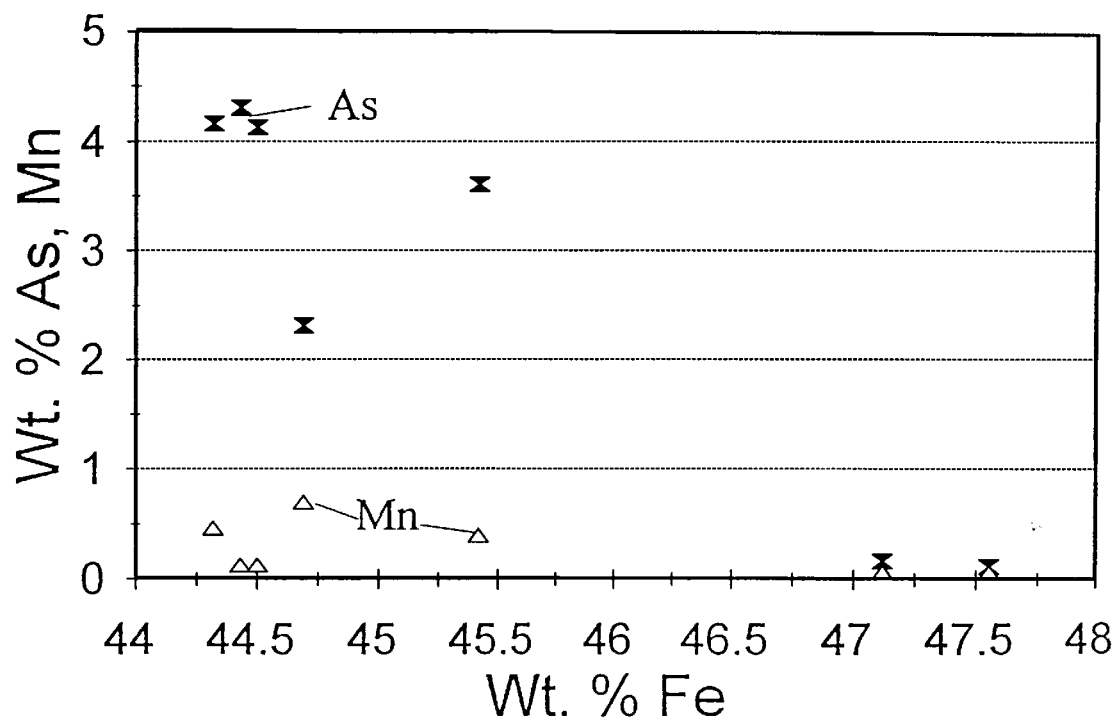
FIG. 6. Electron microprobe data showing concentrations of arsenic and manganese contents versus iron from pyrite formed by sulfate reducing bacteria from Hazelhurst salt dome, Mississippi.
Figure 7:
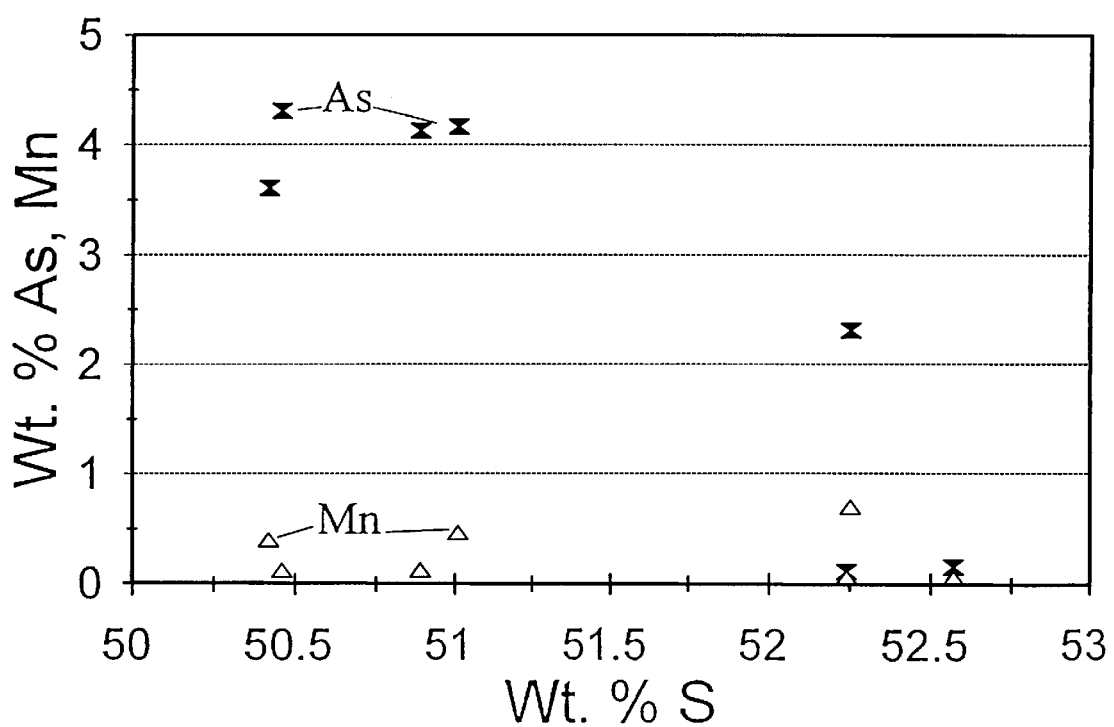
FIG. 7. Electron microprobe data showing concentrations of arsenic and manganese contents versus sulfur in pyrite formed by sulfate reducing bacteria from Hazelhurst salt dome, Mississippi.

SRB also caused the precipitation of iron, lead, and zinc sulfides in a salt dome cap from Mississippi. In this setting, Fe-, Zn-, and Pb-rich brines (up to several ppm of Fe, Pb, Zn, and up to 1 ppm Cd based on present-day oil-field brines in the area; e.g., Kharaka et al. (1987) *Appl. Geochem.* 2:543–561; Saunders and Swann (1990) *J. Geochem Expl.* 37:171–183), entered the cap rock, and mixed with biogenic $H_2S$ produced by SRB. The SRB used hydrocarbons as an organic substrate and $SO_4$ released from the dissolution of cap-rock anhydride ($CaSO_4$). Pyrite in this environment contained up to 4.0% arsenic (35,000 ppm), several hundred ppm thallium, and up to 1000 ppm Mn and Zn as coprecipitates in the crystal lattice. FIG. 6 provides electron microprobe data showing concentrations of arsenic and manganese contents versus iron from pyrite formed by the sulfate reducing bacteria from Hazelhurst salt dome, Mississippi. FIG. 7 provides electron microprobe data showing concentrations of arsenic and manganese contents versus sulfur in pyrite formed by the sulfate reducing bacteria. In addition, cadmium-bearing sphalerite (ZnS) and galena (PbS) are also common. The implication from the cap rock studies is that high levels of metals such as lead, zinc, and cadmium in the brines apparently were not toxic to the SRB. It appears that natural selection can lead to significant toxic-metal tolerance in indigenous bacteria.

The proposed process of the present invention takes advantage of the preference of some trace metals to coprecipitate into iron sulfide as opposed to forming separate metal sulfide phases. Further, because the ferrous iron typically is injected in quantities that will exceed the concentration of the heavy metals within the contaminated groundwater, it is likely that larger iron sulfide grains will form relative to trace metal sulfide materials that would have been formed if the ferrous iron had not been added. Thus, the iron sulfide grains generally will have a much smaller surface area to volume ratio and smaller heavy metal-sulfide mineral grains, and thus will be less chemically reactive if groundwater geochemical conditions change over time.

The present method provides an inexpensure alternative to other clean up practices. It additionally does a faster, more complete job of removing contaminants.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

Although the foregoing invention has been described in some detail by way of illustration and example for purposes of clarity of understanding, it will be obvious that certain changes and modifications may be practiced within the scope of the appended claims.

What is claimed:

1. A method for removing inorganic and organic contaminants from contaminated groundwater in situ said method comprising:

introducing a treatment solution comprising a soluble source of organic carbon, ferrous iron, and sulfate to said contaminated groundwater, and providing said contaminated groundwater with sufficient sulfate-reducing bacteria to coprecipitate the inorganic contaminants into biogenic iron sulfide or pyrite, and reduce the organic contaminants into innocuous by-products, wherein said sulfate-reducing bacteria is present in said groundwater, or is provided in said treatment solution.

2. The method of claim 1, wherein said treatment solution further comprises sulfate reducing bacteria.

3. The method of claim 2, wherein said sulfate reducing bacteria is from the genus Desulfovibrio or Desulfotomaculum.

4. The method of claim 3, wherein said sulfate reducing bacteria is from the genus Desulfovibrio.

5. The method of claim 4, wherein said Desulfovibrio is *D. desulfuricans*.

6. The method of claim 1, wherein said organic carbon is sodium lactate.

7. The method of claim 1, wherein said ferrous iron and sulfate are supplied as ferrous sulfate.

8. The method of claim 1, wherein said treatment solution further comprises nutrients for bacterial metabolism.

9. The method of claim 8, wherein said nutrients are supplied as ammonium phosphate.

10. The method of claim 1, wherein said inorganic contaminants are metals.

11. The method of claim 10, wherein said metals are selected from lead, chromium, arsenic, zinc, copper, cadmium, nickel, mercury, uranium, barium, senium, strontium, plutonium, thorium, and technetium.

12. The method of claim 1, wherein said organic contaminants are chlorinated aliphatic hydrocarbons.

13. The method of claim 12, wherein said chlorinated aliphatic hydrocarbons are selected from carbon tetrachloride, chloroform, trichlorethylene, tetrachloroethylene, or 1,1,1-trichloroethane.

14. An in situ bioremediation process for removing metal and halogenated hydrocarbons from contaminated groundwater said method comprising:

delivering a treatment solution comprising ferrous iron, sulfate, and an organic compound, either into contaminated groundwater or in advance of a migrating plume of contaminated groundwater, and providing said groundwater with an effective amount of sulfate-reducing bacteria to remove said metals and halogenated hydrocarbons, wherein said sulfate-reducing bacteria is present in said groundwater, or is provided in said treatment solution, and wherein said metals are coprecipitated in iron sulfide and said hydrocarbons are reduced into harmless byproducts.

15. The method of claim 14, wherein said delivering step is performed by using a series of injection wells.

16. The method of claim 15, wherein said injection wells utilize mechanically compressed nitrogen gas to keep the treatment solution and aquifer materials under anaerobic conditions.

17. The method of claim 16, wherein said treatment solution further comprises sulfate reducing bacteria.

18. The method of claim 17, wherein said sulfate reducing bacteria is from the genus Desulfovibrio or Desulfotomaculum.

19. The method of claim 18, wherein said sulfate reducing bacteria is from the genus Desulfovibrio.

20. The method of claim 19, wherein said Desulfovibrio is *D. desulfuricans*.

21. The method of claim 20, wherein said organic carbon is sodium lactate.

22. The method of claim 21, wherein said ferrous iron and sulfate are supplied as ferrous sulfate.

23. The method of claim 22, wherein said treatment solution further comprises nutrients for bacterial metabolism.

24. The method of claim 23, wherein said nutrients are supplied as ammonium phosphate.

25. The method of claim 24, wherein said metals are selected from lead, chromium, arsenic, zinc, copper, cadmium, nickel, mercury, uranium, barium, senium, strontium, plutonium, thorium, and technetium.

26. The method of claim 25, wherein said halogenated hydrocarbons are selected from carbon tetrachloride, chloroform, trichlorethylene, tetrachloroethylene, or 1,1,1-trichloroethane.

* * * * *

UNITED STATES PATENT AND TRADEMARK OFFICE
CERTIFICATE OF CORRECTION

PATENT NO.   : 5,833,855
DATED        : Nov. 10, 1998
INVENTOR(S)  : James A. Saunders It is certified that error appears in the above-identified patent and that said Letters Patent is hereby corrected as shown below:

Column 12, line 1, "metal" should read --metals--

Signed and Sealed this

Thirteenth Day of April, 1999

Attest:

Q. TODD DICKINSON

Attesting Officer

Acting Commissioner of Patents and Trademarks

UNITED STATES PATENT AND TRADEMARK OFFICE
CERTIFICATE OF CORRECTION

PATENT NO. : 5,833,855

DATED : November 10, 1998

INVENTOR(S) : James A. Saunders

It is certified that error appears in the above-identified patent and that said Letters Patent is hereby corrected as shown below:

On the cover page, numbered [54], the title of the invention should read - - IN SITU BIOREMEDIATION OF CONTAMINATED GROUNDWATER - -.

Signed and Sealed this

Seventh Day of September, 1999

Attest:

Q. TODD DICKINSON

*Attesting Officer*    *Acting Commissioner of Patents and Trademarks*